United States Patent
Ono et al.

(10) Patent No.: US 8,469,848 B2
(45) Date of Patent: Jun. 25, 2013

(54) VEHICULAR DRIVE APPARATUS

(75) Inventors: Tomohito Ono, Susono (JP); Hideaki Komada, Gotenba (JP); Yukihiko Ideshio, Nisshin (JP); Hiroyuki Shibata, Susono (JP); Miyoshi Kawaguchi, Kariya (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 257 days.

(21) Appl. No.: 13/057,074

(22) PCT Filed: Oct. 22, 2009

(86) PCT No.: PCT/IB2009/007203
§ 371 (c)(1),
(2), (4) Date: Feb. 1, 2011

(87) PCT Pub. No.: WO2010/046765
PCT Pub. Date: Apr. 29, 2010

(65) Prior Publication Data
US 2011/0143875 A1   Jun. 16, 2011

(30) Foreign Application Priority Data
Oct. 24, 2008  (JP) .................. 2008-274586

(51) Int. Cl.
*F16H 3/72*   (2006.01)
*F16H 37/06*  (2006.01)

(52) U.S. Cl.
USPC .............................. 475/5; 475/313

(58) Field of Classification Search
USPC .............. 475/5, 8, 10, 204, 205, 221, 269, 475/275, 296, 311, 313, 330
See application file for complete search history.

(56) References Cited

U.S. PATENT DOCUMENTS

| | | | |
|---|---|---|---|
| 7,247,112 B2 * | 7/2007 | Foster et al. | 475/5 |
| 8,221,279 B2 * | 7/2012 | Reed et al. | 475/269 |
| 2003/0064846 A1 * | 4/2003 | Klemen et al. | 475/5 |
| 2005/0206248 A1 | 9/2005 | Raszkowski et al. | |
| 2007/0225098 A1 | 9/2007 | Tabata et al. | |
| 2008/0207372 A1 * | 8/2008 | Holmes et al. | 475/5 |
| 2009/0118917 A1 * | 5/2009 | Sah et al. | 701/54 |

FOREIGN PATENT DOCUMENTS

| | | |
|---|---|---|
| JP | 6 328950 | 11/1994 |
| JP | 2003 191761 | 7/2003 |
| JP | 2005 127411 | 5/2005 |
| JP | 2005 170159 | 6/2005 |

(Continued)

OTHER PUBLICATIONS

International Search Report issued Feb. 15, 2010 PCT/IB09/07203 filed Oct. 22, 2009.

*Primary Examiner* — Justin Holmes
(74) *Attorney, Agent, or Firm* — Oblon, Spivak, McClelland, Maier & Neustadt, L.L.P.

(57) ABSTRACT

In a drive apparatus in which a first motor-generator, a power split device, a shift mechanism, and a second motor-generator are coaxially arranged, a first support wall which is next to the second motor-generator and supports one end of a rotor, and a second support wall that supports the other end of the rotor are provided in a case. A switching portion of the shift mechanism is provided on the first support wall. This kind of structure enables the drive apparatus to be shorter in the axial direction.

12 Claims, 4 Drawing Sheets

FOREIGN PATENT DOCUMENTS

| | | |
|---|---|---|
| JP | 2006 175951 | 7/2006 |
| JP | 2006 322520 | 11/2006 |
| JP | 2007 131235 | 5/2007 |
| JP | 2008 195196 | 8/2008 |
| WO | 2006 137589 | 12/2006 |
| WO | 2008 075760 | 6/2008 |

* cited by examiner

FIG. 4

VEHICULAR DRIVE APPARATUS

INCORPORATION BY REFERENCE

The disclosure of Japanese Patent Application No. 2008-274586 filed on Oct. 24, 2008, including the specification, drawings and abstract is incorporated herein by reference in its entirety.

BACKGROUND OF THE INVENTION

1. Field of the Invention

The invention relates to a vehicular drive apparatus provided with an electric motor.

2. Description of the Related Art

Japanese Patent Application Publication No. 6-328950 (JP-A-6-328950) describes a vehicular drive apparatus which is provided with a generator and a motor arranged on the same axis as an output shaft of an internal combustion engine, and in which a clutch and an output gear of an automatic transmission are arranged between the generator and the motor. In addition, Japanese Patent Application Publication No. 2003-191761 (JP-A-2003-191761) and Japanese Patent Application Publication No. 2005-127411 (JP-A-2005-127411) also describe prior art related to the invention.

With the drive apparatus described in JP-A-6-328950, a support wall that supports the motor is separate from a support wall on which the clutch of the automatic transmission is arranged, which tends to increase the dimensions of the drive apparatus in the axial direction. Accordingly, the need arises to devise a way to suppress this increase in dimensions in the axial direction, such as arranging the constituent elements of the automatic transmission on the inner periphery of the rotor of the motor, for example, which may make the structure complicated.

SUMMARY OF THE INVENTION

In view of the foregoing problems, this invention thus provides a vehicular drive apparatus capable of inhibiting an increase in the dimensions in the axial direction.

Therefore, a first aspect of the invention relates to a vehicular drive apparatus which is provided with a first electric motor; a first differential mechanism having a first rotating element that is connected to an internal combustion engine, a second rotating element that is connected to the first electric motor, and a third rotating element that outputs power; an intermediate rotating member that transmits power output from the third rotating element of the first differential mechanism; a second electric motor; a case to which a stator of the second electric motor is fixed; a second differential mechanism having a fourth rotating element that is connected to the second electric motor, a fifth rotating element that is connected to the case, and a sixth rotating element that is connected to the intermediate rotating member; an output portion that transmits power to a driving wheel; and a shift mechanism which has a switching portion that switches a power transmitting path to the output portion and which changes the speed of rotation of the intermediate rotating member and transmits that rotation to the output portion, the first electric motor, the first differential mechanism, the shift mechanism, and the second electric motor being coaxially arranged. In this vehicular drive apparatus, a first support wall which is next to the second electric motor and supports one end of a rotor of the second electric motor, and a second support wall that supports the other end of the rotor of the second electric motor are provided in the case, and the switching portion of the shift mechanism is arranged on the first support wall. At this time, the rotor may be supported by a first bearing which is supported by the first support wall and a second bearing which is supported by the second support wall.

According to this drive apparatus, the switching portion of the shift mechanism is arranged on the first support wall that supports one end of the rotor of the second electric motor. That is, both the rotor of the second electric motor and the switching portion are able to be supported by the common first support wall, so the drive apparatus can be made shorter in the axial direction compared with a drive apparatus in which the rotor of the second electric motor and the switching portion are supported by separate support walls.

Also, in the drive apparatus described above, the second differential mechanism may be arranged on the opposite side of the second support wall from the first support wall, and the intermediate rotating member which is connected to the sixth rotating element of the second differential mechanism may be supported by the first support wall and a third support wall which is provided on the opposite side of the second differential mechanism from the second support wall. At this time, the intermediate rotating member of the second electric motor may be supported by the first bearing which is supported by the first support wall, and a third bearing which is supported by the third support wall.

According to the drive apparatus described above, one end of the intermediate rotating member can be supported by the first support wall, so an increase in the dimensions of the intermediate rotating member in the axial direction can be inhibited compared with when that one end is supported by a support wall other than the first support wall.

Also, in the drive apparatus described above, the second differential mechanism may be structured as a planetary gear set that has a sun gear, a ring gear, and a carrier which rotate differentially with respect to each other. Also, the sun gear may correspond to the fourth rotating element, the carrier may correspond to the fifth rotating element, and the ring gear may correspond to the sixth rotating element.

Also, in the drive apparatus described above, the first electric motor, the first differential mechanism, the shift mechanism, the second electric motor, and the second differential mechanism may be arranged on the same axis in that order from the internal combustion engine side, and the output portion may be arranged on the outer peripheral side of the first differential mechanism and the shift mechanism. In this case, the output portion is arranged on the outer peripheral side of the first differential mechanism and the shift mechanism, so the drive apparatus can easily be made shorter in the axial direction compared to when the output portion is arranged next to the first differential mechanism or the shift mechanism.

Furthermore, the shift mechanism may include a third differential mechanism that is structured as a double pinion planetary gear set that has a sun gear, a ring gear, and a carrier which rotate differentially with respect to each other. Also, a clutch that selectively connects and disconnects the sun gear to and from the carrier and a brake that selectively connects and disconnects the sun gear to and from the case are provided as the switching portion. Moreover, the ring gear may be connected to the output portion and the carrier may be connected to the intermediate rotating member. According to this kind of drive apparatus, power is output from the ring gear. Therefore, power can easily be output to the output portion from the outer periphery of the shift mechanism without increasing the dimensions in the axial direction compared to when power is output to the output portion on the outer periphery of the shift mechanism from another element such as the sun gear or the carrier or the like.

Also, in the drive apparatus described above, the output portion may have a counter drive gear that rotates together with the ring gear of the third differential mechanism, a counter driven gear that is in mesh with the counter drive gear, and a differential unit that transmits power from the counter driven gear to the driving wheel. Furthermore, the counter drive gear, the counter driven gear, and the differential unit may all be supported by the common case.

According to this kind of drive apparatus, the counter drive gear, the counter driven gear, and the differential unit are all supported by the same case. As a result, a drive apparatus in which there is little assembly error and which has high support stiffness is able to be provided.

Also, in the drive apparatus described above, the clutch may be structured as a multiple disc clutch that has a plurality of first clutch discs provided on the carrier so as to rotate together with the carrier, a plurality of second clutch discs which are arranged between the first clutch discs and are able to rotate together with the sun gear, and a clutch piston that presses the second clutch discs and the first clutch discs together, and the brake may be structured as a multiple disc brake that has a plurality of first brake discs provided on the case so as to be fixed to the case in the rotating direction, a plurality of second brake discs which are arranged between the first brake discs and are able to rotate together with the sun gear, and a brake piston that presses the first brake discs and the second brake discs together. Also, the second clutch discs of the clutch and the second brake discs of the brake may be provided overlapping one another in the axial direction on a common rotating member which is able to rotate together with the sun gear.

In the drive apparatus described above, the brake and the clutch are arranged such that the second clutch discs and the second brake discs overlap one another in the axial direction, so the drive apparatus is able to be shorter in the axial direction compared to when the brake and the clutch are lined up in the axial direction. Also, the second clutch discs and the second brake discs are provided on a common rotating member so the number of parts can be reduced, thereby enabling the size, weight, and cost of the drive apparatus to be reduced.

Furthermore, in the drive apparatus described above, the second differential mechanism may be structured as a single pinion planetary gear set that has a fixed carrier which is provided as a fifth rotating element and is fixed to the second support wall. Also, a lubrication oil passage which leads oil that has cooled the second electric motor to a pinion supported by the fixed carrier may be provided in the second support wall. According to this kind of drive apparatus, the lubrication oil passage can be formed using the second support wall, so the structure of the lubrication oil passage can be simpler than it is when the lubrication passage is formed independent of the second support wall.

As described above, with the drive apparatus of the invention, the rotor of the second electric motor and the switching portion are both supported by the common first support wall. As a result, the drive apparatus can be made shorter in the axial direction than a drive apparatus in which the rotor of the second electric motor and the switching portion are supported by separate support walls.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
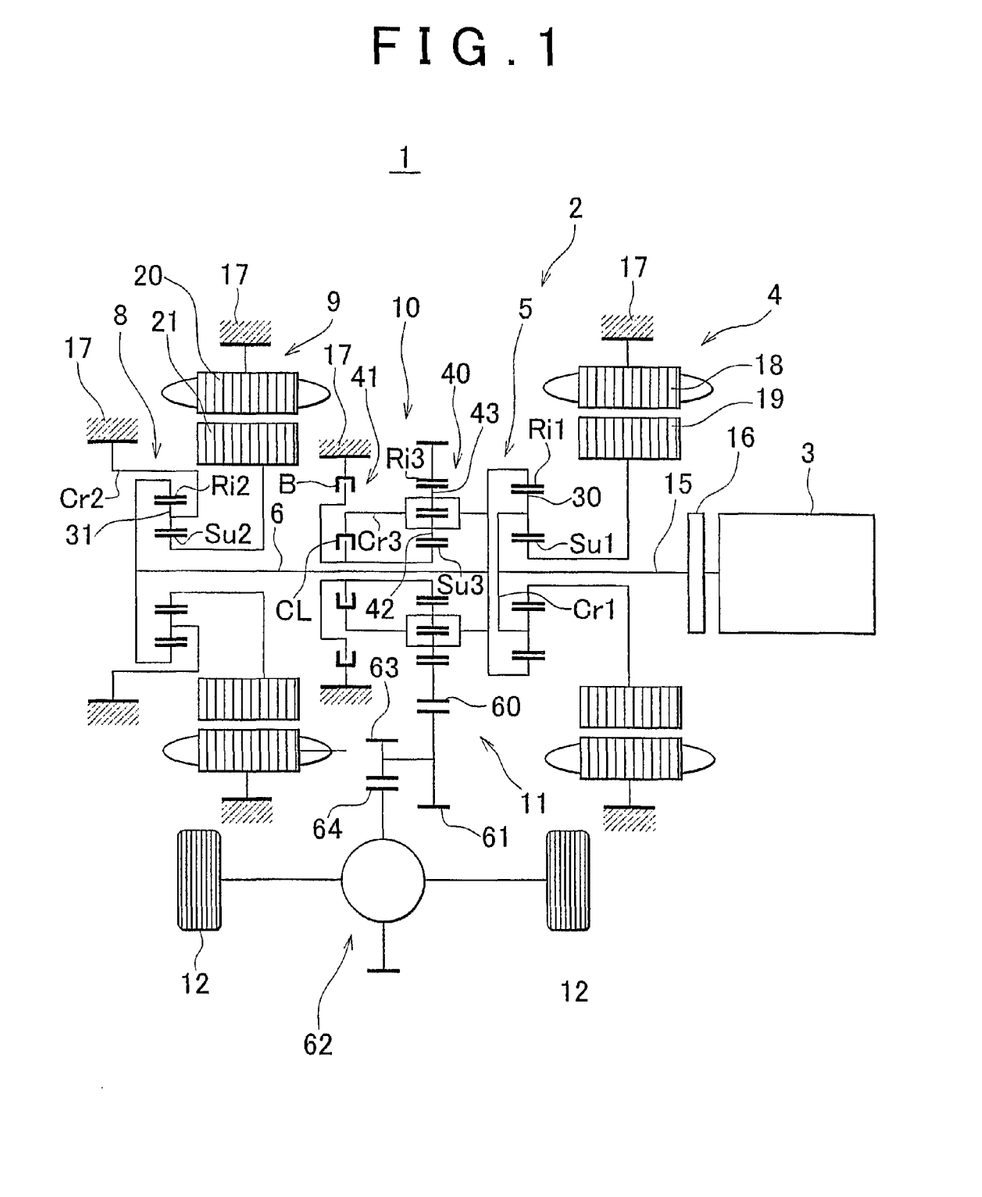
FIG. 1 is a schematic diagram of the overall structure of a vehicle into which a drive apparatus according to an example embodiment of the invention has been incorporated.
Figure 2:
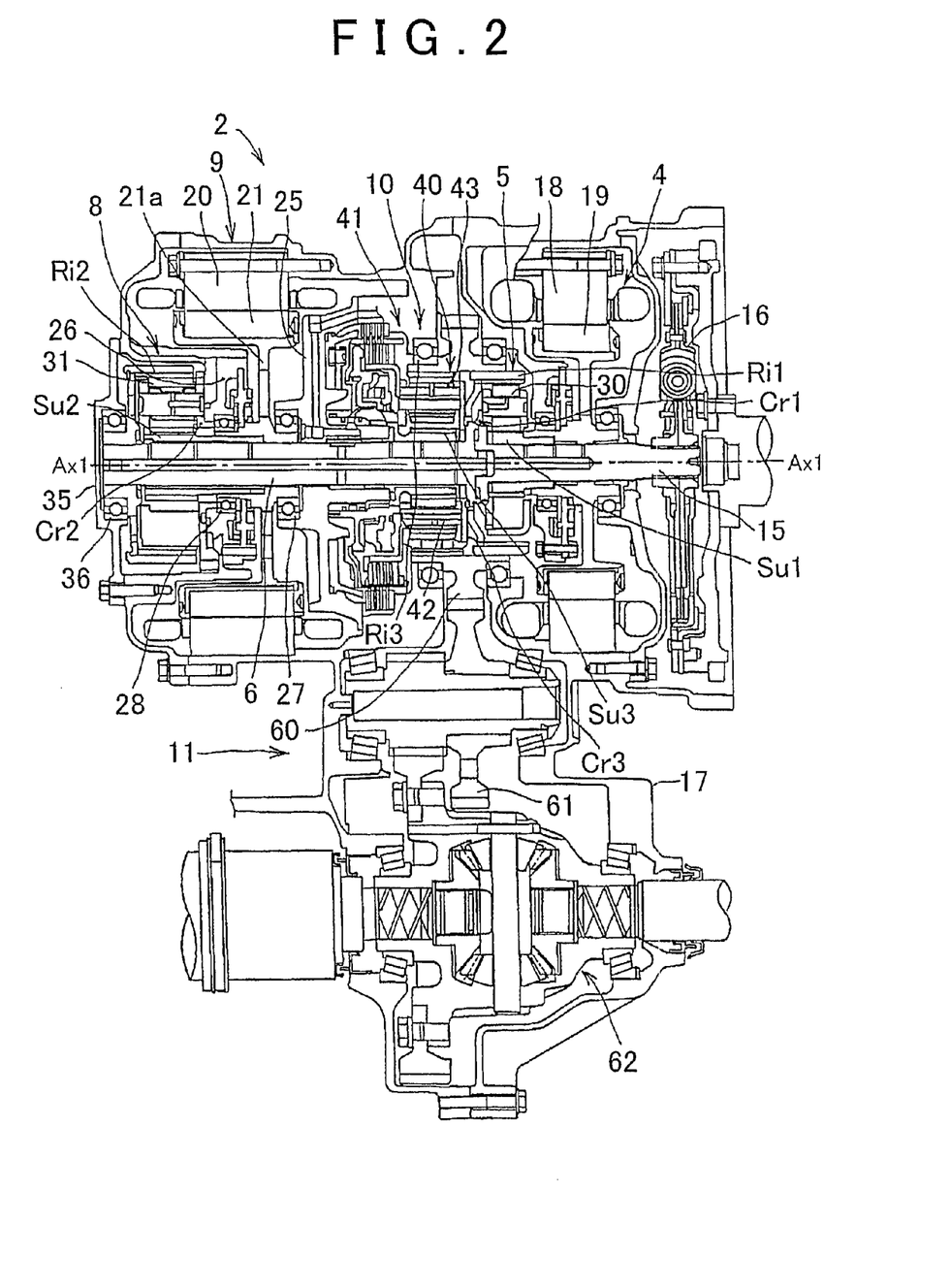
FIG. 2 is a detailed view of the drive apparatus shown in FIG. 1.

FIG. 1 is a schematic diagram of the overall structure of a vehicle into which a drive apparatus according to an example embodiment of the invention has been incorporated, and FIG. 2 is a detailed view of the drive apparatus shown in FIG. 1. The vehicle 1 is configured as a so-called hybrid vehicle. As is well known, a hybrid vehicle is a vehicle which is provided with both an internal combustion engine and an electric motor as driving power sources for running. The vehicle 1 has a FF layout in which the driving wheels and the internal combustion engine are positioned in the front of the vehicle.

A drive apparatus 2 includes a first motor-generator 4, a power split device 5 which serves as a first differential mechanism that is connected to both an internal combustion engine 3 and the first motor-generator 4, and an intermediate shaft 6 which serves as an intermediate rotating member to which power is transmitted from the power split device 5. The drive apparatus 2 is also provided with a second motor-generator 9 which is connected to the intermediate shaft 6 via a reduction mechanism 8 that serves as a second differential mechanism. Power from the intermediate shaft 6 is transmitted to an output portion 11 via a shift mechanism 10, and the power from this output portion 11 is transmitted to left and right driving wheels 12. The first motor-generator 4, the power split device 5, the shift mechanism 10, the second motor-generator 9, and the reduction mechanism 8 are all coaxially arranged in that order from the internal combustion engine 3 side, as shown in the drawing.

The internal combustion engine 3 is a spark ignition multi-cylinder internal combustion engine which outputs power to the power split device 5 via an input shaft 15. This input shaft 15 is arranged on the same axis as the intermediate shaft 6, such that the input shaft 15 and the intermediate shaft 6 rotate about a common axis Ax1 (see FIG. 2). A damper 16 which absorbs torque fluctuation of the internal combustion engine 3 is interposed between the input shaft 15 and the internal combustion engine 3.

The first motor-generator 4 and the second motor-generator 9 have the same structure and are able to function both as an electric motor and a generator. The first electric motor 4 is provided with a stator 18 that is fixed to a case 17, and a rotor 19 that is coaxially arranged on the inner peripheral side of the stator 18. Similarly, the second motor-generator 9 is provided with a stator 20 that is fixed to the case 17, and a rotor 21 that is coaxially arranged on the inner peripheral side of the stator 20. The first motor-generator 4 is one example of a first electric motor of the invention and the second motor-generator 9 is an example of a second electric motor of the invention. As shown in FIG. 2, the rotor 21 of the second motor-generator 9 has a support portion 21a that supports a rotor core that is formed of layers of laminated magnetic steel sheets. This support portion 21a is coaxially arranged on the outer periphery of the intermediate shaft 6 in such a manner that it can rotate relative to the intermediate shaft 6. One end (the right end in the drawing) of the rotor 21 of the second motor-generator 9 is rotatably supported by a first support wall 25 via a bearing 27, while the other end (the left end in the drawing) of the rotor 21 is rotatably supported by a second support 26 wall via a bearing 28. The first support wall 25 and the second support wall 26 are fixed to the case 17 and are thus still with respect to the case 17.

The power split device 5 is structured as a single pinion planetary gear set that has three rotating elements which are able to rotate differentially with respect to each other. These three rotating elements are a sun gear Su1 which is a gear with external teeth, a ring gear Ri1 which is a gear with internal teeth that is arranged on the same axis as the sun gear Su1, and a carrier Cr1 that rotatably and revolvably retains pinions 30 which are in mesh with both the sun gear Su1 and the ring gear Ri1. In this example embodiment, the input shaft 15 is connected to the carrier Cr1, the first motor-generator 4 is connected to the sun gear Su1, and the intermediate shaft 6 is connected to the ring gear Ri1. Therefore, in this example embodiment, the carrier Cr1 is an example of a first rotating element of the invention, the sun gear Su1 is an example of a second rotating element of the invention, and the ring gear Ri1 is an example of a third rotating element of the invention.

The reduction mechanism 8 is a single pinion planetary gear set that has three rotating elements which are able to rotate differentially with respect to each other. These three rotating elements are a sun gear Su2 which is a gear with external teeth that is arranged on the opposite side of the second support wall 26 from the first support wall 25, a ring gear Ri2 which is a gear with internal teeth that is arranged on the same axis as the sun gear Su2, and a carrier Cr2 that rotatably and revolvably retains pinions 31 which are in mesh with both the sun gear Su2 and the ring gear Ri2. In this example embodiment, the second motor-generator 9 is connected to the sun gear Su2, the case 17 (i.e., the second support wall 26) is connected to the carrier Cr2, and the intermediate shaft 6 is connected to the ring gear Ri2. Therefore, in this example embodiment, the sun gear Su2 is an example of a fourth rotating element of the invention, the carrier Cr2 is an example of a fifth rotating element of the invention, and the ring gear Ri2 is an example of a sixth rotating element of the invention. Also, the carrier Cr2 is an example of a fixed carrier of the invention.

Figure 3:
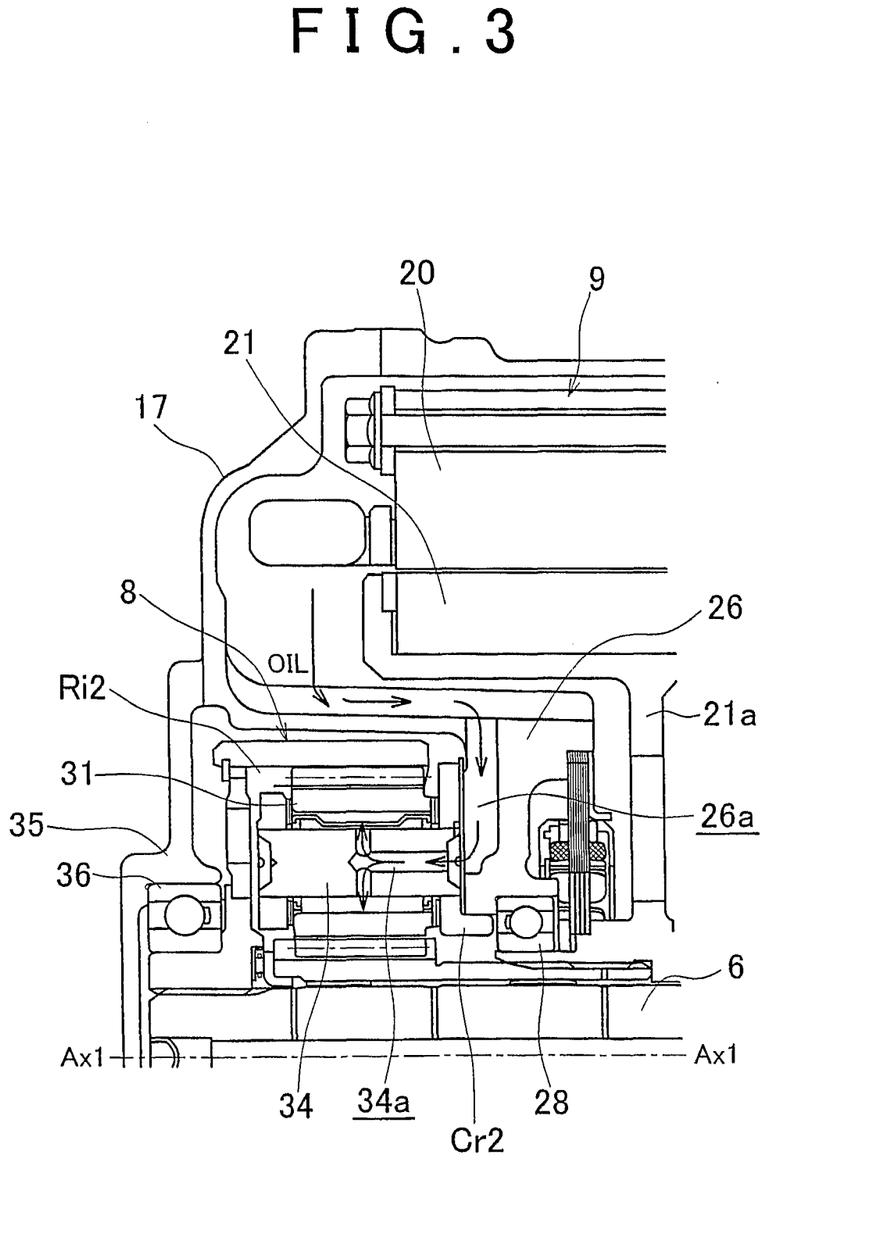
FIG. 3 is a enlarged view of a reduction mechanism shown in FIG. 2 and the area around that reduction mechanism.

FIG. 3 is an enlarged view of the reduction mechanism 8 shown in FIG. 2 and the area around that reduction mechanism 8. As shown in the drawing, a support shaft 34 is provided for each of the pinions 31 on the carrier Cr2 of the reduction mechanism 8 to rotatably support the pinions 31. An oil supply passage 34a is formed in this support shaft 34. This oil supply passage 34a opens to the outer peripheral surface of the support shaft 34 as well as to the end portion on the second support wall 26 side of the support shaft 34. One end of a lubrication oil passage 26a that is formed in the second support wall 26 is connected to this oil supply passage 34a. The other end of this lubrication oil passage 26a is open to the second motor-generator 9 side. Therefore, oil that has been used to cool the second motor-generator 9 can be led to the pinion 31 through the lubrication oil passage 26a formed in the second support wall 26 and the oil supply passage 34a formed in the support shaft 34, as shown by the arrows in FIG. 3. In this way, the lubrication oil passage 26a can be formed using the second support wall 26 so the structure of the lubrication oil passage can be simpler than it is when the lubrication passage is formed independent of the second support wall 26.

As shown in FIGS. 1 to 3, the ring gear Ri2 is spline-engaged to the end portion on the left side of the intermediate shaft 6 so that it is unable to rotate relative to the intermediate shaft 6 (see FIG. 3). The intermediate shaft 6 is supported by the first support wall 25, the second support wall 26, and a third support wall 35 which is provided on the opposite side of the reduction mechanism 8 from the second support wall 26, while the rotor 21 of the second motor-generator 9 and the reduction mechanism 8 are arranged on the outer periphery. The third support wall 35 is fixed to the case 17. As shown in FIGS. 2 and 3, a bearing 36 is interposed between the third support wall 35 and the intermediate shaft 6, such that the intermediate shaft 6 is rotatably supported by the third support wall 35 via this bearing 36.

The shift mechanism 10 includes a differential mechanism 40 structured as a double pinion planetary gear set that has three rotating elements which are able to rotate differentially with respect to each other, and a switching portion 41 that changes the power transmitting path to the output portion 11. The differential mechanism 40 is one example of a third differential mechanism of the invention. The differential mechanism 40 has a sun gear Su3 which is a gear with external teeth, a ring gear Ri3 which is a gear with internal teeth that is arranged on the same axis as the sun gear Su3, and a carrier Cr3 that rotatably and revolvably retains first pinions 42 and second pinions 43, with the first pinions 42 being in mesh with the sun gear Su3 and the second pinions 43, and the second pinions 43 being in mesh with the first pinions 42 and the ring gear Ri3. The switching portion 41 has a clutch CL and a brake B. The clutch CL selectively connects and disconnects the sun gear Su3 to and from the carrier Cr3, and the brake B selectively connects and disconnects the sun gear Su3 to and from the case 17.

The shift mechanism 10 selectively establishes first speed which has a high gear ratio and second speed which has a low gear ratio by changing the operating states of the clutch CL and the brake B of the switching portion 41. First speed is established by applying the brake B to connect the sun gear Su3 to the case 17 while the clutch CL is released such that the sun gear Su3 is disconnected from the carrier Cr3. On the other hand, second speed is established by releasing the brake B to disconnect the sun gear Su3 from the case 17, while the clutch CL is applied such that the sun gear Su3 is connected to the carrier Cr3. Shift control of the shift mechanism 10 is performed based on the vehicle speed and the accelerator operation amount, as is well known.

Figure 4:
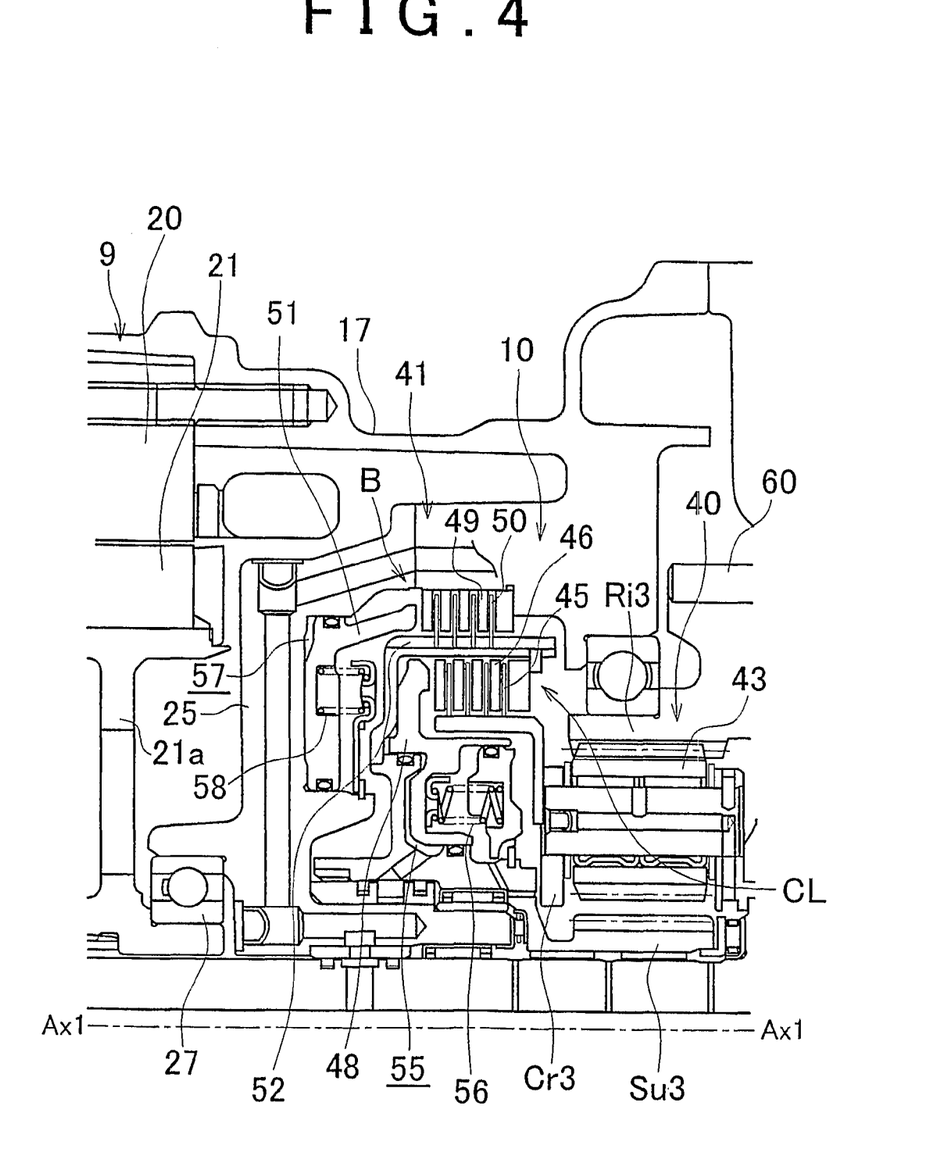
FIG. 4 is an enlarged view of a switching portion shown in FIG. 2 and the area around that switching portion.

FIG. 4 is an enlarged view of the switching portion 41 shown in FIG. 2 and the area around that switching portion 41. As shown in this drawing as well, the switching portion 41 is arranged on the first support wall 25 which is adjacent to the second motor-generator 9, and the clutch CL and the brake B are compactly arranged overlapping one another in the axial direction. The clutch CL is structured as a multiple disc clutch that has a plurality (four in the drawing) of first clutch discs 45 provided on the carrier Cr3 of the differential mechanism 40 so as to be able to rotate together with the carrier Cr3, a plurality (four in the drawing) of second clutch discs 46 which are arranged between the first clutch discs 45 and are able to rotate together with the sun gear Su3, and a clutch piston 48 for pressing the second clutch discs 46 and the first clutch discs 45 together. Meanwhile, the brake B is structured as a multiple disc brake that has a plurality (four in the drawing) of first brake discs 49 provided on the case 17 so as to be able to rotate together with the case 17, a plurality (four in the drawing) of second brake discs 50 which are provided between the first brake discs 49 and are able to rotate together with the sun gear Su3, and a brake piston 51 for pressing the first brake discs 49 and the second brake discs 50 together. The second clutch discs 46 of the clutch CL and the second brake discs 50 of the brake B are provided overlapping one another in the axial direction on a common rotating member 52 which is able to rotate together with the sun gear Su3. The second clutch discs 46 are fitted to the radial inside of the rotating member 52, and the second brake discs 50 are fitted to the radial outside of the rotating member 52.

The clutch piston 48 of the clutch CL is housed in a piston chamber 55 that is adjacent to the rotating member 52. A return spring 56 that urges the clutch piston 48 away from the clutch discs 45 and 46 is provided in this piston chamber 55. The clutch CL can be switched between an applied state in which it connects the sun gear Su3 to the carrier Cr3, and a released state in which it disconnects the sun gear Su3 from the carrier Cr3, by controlling the supply of hydraulic fluid to the piston chamber 55 using a control valve, not shown. Meanwhile, the brake piston 51 of the brake B is housed in a piston chamber 57 formed by the first support wall 25. A return spring 58 that urges the brake piston 51 away from the brake discs 49 and 50 is provided in this piston chamber 57. Similar to the clutch CL, the brake B can be switched between an applied state in which it connects the sun gear Su3 to the case 17, and a released state in which it disconnects the sun gear Su3 from the case 17, by controlling the supply of hydraulic fluid to the piston chamber 57 using a control valve, not shown.

Arranging the brake B and the clutch CL such that the second clutch discs 46 and the second brake discs 50 overlap one another in the axial direction enables the switching portion 41 to be shorter in the axial direction compared with when the brake B and the clutch CL are lined up in the axial direction. Also, the second clutch discs 56 and the second brake discs 50 are provided on a common rotating member 52 so the number of parts can be reduced, thereby enabling the size, weight, and cost of the drive apparatus to be reduced.

As shown in FIGS. 1 and 2, the output portion 11 is arranged on the outer peripheral side of the power split device 5 and the shift mechanism 10. Therefore, the drive apparatus can easily be made shorter in the axial direction compared to when the output portion 11 is arranged next to the power split device 5 or the shift mechanism 10. Also, the output portion 11 includes a counter drive gear 60 that rotates together with the ring gear Ri3 of the differential mechanism 40, a counter driven gear 61 that is in mesh with the counter drive gear 60, and a differential unit 62 that transmits the power from the counter driven gear 61 to the driving wheels 12 (see FIG. 1). An intermediate gear 63 that is on the same axis as the counter driven gear 61 and rotates together with that counter driven gear 61 is interposed between the counter driven gear 61 and the differential unit 62. The intermediate gear 63 is in mesh with a driven gear 64 provided on the case of the differential unit 62. As shown in FIG. 2, the counter drive gear 60, the counter driven gear 61, and the differential unit 62 are all supported by the common case 17. Therefore, the constituent elements of the output portion 11 are able to be assembled with less error and easily have greater support stiffness than in situations in which they are supported by a housing that is separate from the case 17.

According to the drive apparatus 2 described above, the rotor 21 of the second motor-generator 9 and the switching portion 41 can both be supported by the common first support wall 25, which enables the drive apparatus 2 to be shorter in the axial direction compared with a situation in which they are supported by different support walls. Also, the intermediate shaft 6 is supported by the first support wall 25 and the third support wall 35. Therefore, the dimensions of the intermediate shaft 6 in the axial direction can be inhibited from increasing compared with when the end of the intermediate shaft 6 is supported by a support wall other than the first support wall 25.

While the invention has been described with reference to exemplary embodiments thereof, it is to be understood that the invention is not limited to the exemplary embodiments or constructions. On the contrary, the invention is intended to cover various modifications and equivalent arrangements within the scope of the invention. For example, the arrangement of the constituent elements of the drive apparatus 2 described above is only an example. As long as the first motor-generator 4, the power split device 5, the shift mechanism 10, the second motor-generator 9, and the reduction mechanism 8 are coaxially arranged and the shift mechanism 10 and the second motor-generator 9 are next to one another, the order in which these constituent elements are arranged may be changed as appropriate. Also, the differential mechanisms of the example embodiments described above are only examples. These differential mechanisms may also be modified as long as the modified differential mechanisms are mechanically equivalent. Further, the differential mechanisms are realized by planetary gear sets but the invention is not limited to this. For example, all or part of the planetary gear sets in the example embodiments described above may be replaced by a planetary roller mechanism which has a friction wheel (i.e., a roller), which is not a gear, as a rotating element.

The invention claimed is:

1. A vehicular drive apparatus comprising:
   a first electric motor;
   a first differential mechanism having a first rotating element that is connected to an internal combustion engine, a second rotating element that is connected to the first electric motor, and a third rotating element that outputs power;
   an intermediate rotating member that transmits power output from the third rotating element of the first differential mechanism;
   a second electric motor;
   a case to which a stator of the second electric motor is fixed;
   a second differential mechanism having a fourth rotating element that is connected to the second electric motor, a fifth rotating element that is connected to the case, and a sixth rotating element that is connected to the intermediate rotating member;
   an output portion that transmits power to a driving wheel; and
   a shift mechanism which has a switching portion that switches a power transmitting path to the output portion and which changes a speed of rotation of the intermediate rotating member and transmits the rotation to the output portion, wherein
   the first electric motor, the first differential mechanism, the shift mechanism, and the second electric motor are coaxially arranged, and
   a first support wall which is next to the second electric motor and a second support wall are provided in the case,
   wherein the first support wall defines a common wall which supports both one end of a rotor of the second electric motor and the switching portion of the shift mechanism, and
   the second support wall supports the other end of the rotor of the second electric motor.

2. The drive apparatus according to claim 1, wherein the rotor is supported by a first bearing which is supported by the first support wall and a second bearing which is supported by the second support wall.

3. The drive apparatus according to claim 1, wherein the second differential mechanism is arranged on the opposite side of the second support wall from the first support wall, and the intermediate rotating member which is connected to the sixth rotating element of the second differential mechanism is supported by the first support wall and a third support wall which is provided on the opposite side of the second differential mechanism from the second support wall.

4. The drive apparatus according to claim 3, wherein the intermediate rotating member of the second electric motor is supported by the first bearing which is supported by the first support wall, and a third bearing which is supported by the third support wall.

5. The drive apparatus according to claim 1, wherein the second differential mechanism is configured as a planetary gear set that has a sun gear, a ring gear, and a carrier which rotate differentially with respect to each other; the sun gear corresponds to the fourth rotating element; the carrier corresponds to the fifth rotating element; and the ring gear corresponds to the sixth rotating element.

6. The drive apparatus according to claim 1, wherein the first electric motor, the first differential mechanism, the shift mechanism, the second electric motor, and the second differential mechanism are sequentially arranged on a same axis in that order from the internal combustion engine side, and the output portion is arranged on an outer peripheral side of the first differential mechanism and the shift mechanism.

7. The drive apparatus according to claim 6, wherein the shift mechanism includes a third differential mechanism that is configured as a double pinion planetary gear set that has a sun gear, a ring gear, and a carrier which rotate differentially with respect to each other; a clutch that selectively connects and disconnects the sun gear to and from the carrier and a brake that selectively connects and disconnects the sun gear to and from the case are provided as the switching portion; and the ring gear is connected to the output portion and the carrier is connected to the intermediate rotating member.

8. The drive apparatus according to claim 7, wherein the output portion has a counter drive gear that rotates together with the ring gear of the third differential mechanism, a counter driven gear that is in mesh with the counter drive gear, and a differential unit that transmits power from the counter driven gear to the driving wheel; and the counter drive gear, the counter driven gear, and the differential unit are all supported by the common case.

9. The drive apparatus according to claim 7, wherein the clutch is configured as a multiple disc clutch that has a plurality of first clutch discs provided on the carrier so as to rotate together with the carrier, a plurality of second clutch discs which are arranged between the first clutch discs and are able to rotate together with the sun gear, and a clutch piston that presses the second clutch discs and the first clutch discs together; the brake is configured as a multiple disc brake that has a plurality of first brake discs provided on the case so as to be fixed to the case in the rotating direction, a plurality of second brake discs which are arranged between the first brake discs and are able to rotate together with the sun gear, and a brake piston that presses the first brake discs and the second brake discs together; and the second clutch discs of the clutch and the second brake discs of the brake are provided overlapping one another in the axial direction on a common rotating member which is able to rotate together with the sun gear.

10. The drive apparatus according to claim 9, wherein the brake piston is housed in a piston chamber formed by the first support wall.

11. The drive apparatus according to claim 10, wherein a switch between an applied state and a released state is achieved by controlling supply of hydraulic fluid to the piston chamber.

12. The drive apparatus according to claim 1, wherein the second differential mechanism is configured as a single pinion planetary gear set that has a fixed carrier which is provided as the fifth rotating element and is fixed to the second support wall; and a lubrication oil passage which leads oil that has cooled the second electric motor to a pinion supported by the fixed carrier is provided in the second support wall.

\* \* \* \* \*